United States Patent [19]

Stenger et al.

[11] Patent Number: 4,929,382
[45] Date of Patent: May 29, 1990

[54] CATIONIC COAGULANTS PLUS COLLOIDAL SILICA FOR USE IN PAINT DETACKIFICATION

[75] Inventors: Claudia V. Stenger; Shu-Jen W. Huang, both of Naperville, Ill.

[73] Assignee: Nalco Chemical Company, Naperville, Ill.

[21] Appl. No.: 318,308

[22] Filed: Mar. 3, 1989

Related U.S. Application Data

[63] Continuation-in-part of Ser. No. 226,595, Aug. 1, 1988, Pat. No. 4,863,615.

[51] Int. Cl.$^5$ .............................................. C02F 1/56
[52] U.S. Cl. .................................... 252/181; 252/175
[58] Field of Search ............. 55/85; 134/38; 210/712, 210/723, 725, 727, 728, 736; 252/175, 181; 427/331

[56] References Cited

U.S. PATENT DOCUMENTS

| | | | |
|---|---|---|---|
| 3,515,575 | 6/1970 | Arnold | 55/84 |
| 3,738,945 | 6/1973 | Panzer et al. | 210/736 |
| 4,098,693 | 7/1978 | Tonkyn et al. | 210/728 |
| 4,153,548 | 5/1979 | Forney | 210/728 |
| 4,504,395 | 3/1985 | Harpel et al. | 210/712 |
| 4,564,464 | 1/1986 | Harpel et al. | 252/181 |
| 4,600,513 | 7/1986 | Mizutani et al. | 210/712 |
| 4,629,572 | 12/1986 | Leitz et al. | 210/714 |
| 4,759,855 | 7/1988 | Kaiser | 55/85 |
| 4,853,132 | 8/1989 | Merrell et al. | 210/712 |

Primary Examiner—Peter Hruskoci
Attorney, Agent, or Firm—Donald G. Epple; John G. Premo

[57] ABSTRACT

Water soluble low molecular weight cationic polymeric coagulants in combination with colloidal silica are excellent paint detackification agents for treating paint spray booth waters which are contaminated with paint particles.

2 Claims, 1 Drawing Sheet

LAB SCALE SPRAY RECIRCULATION TEST EQUIPMENT

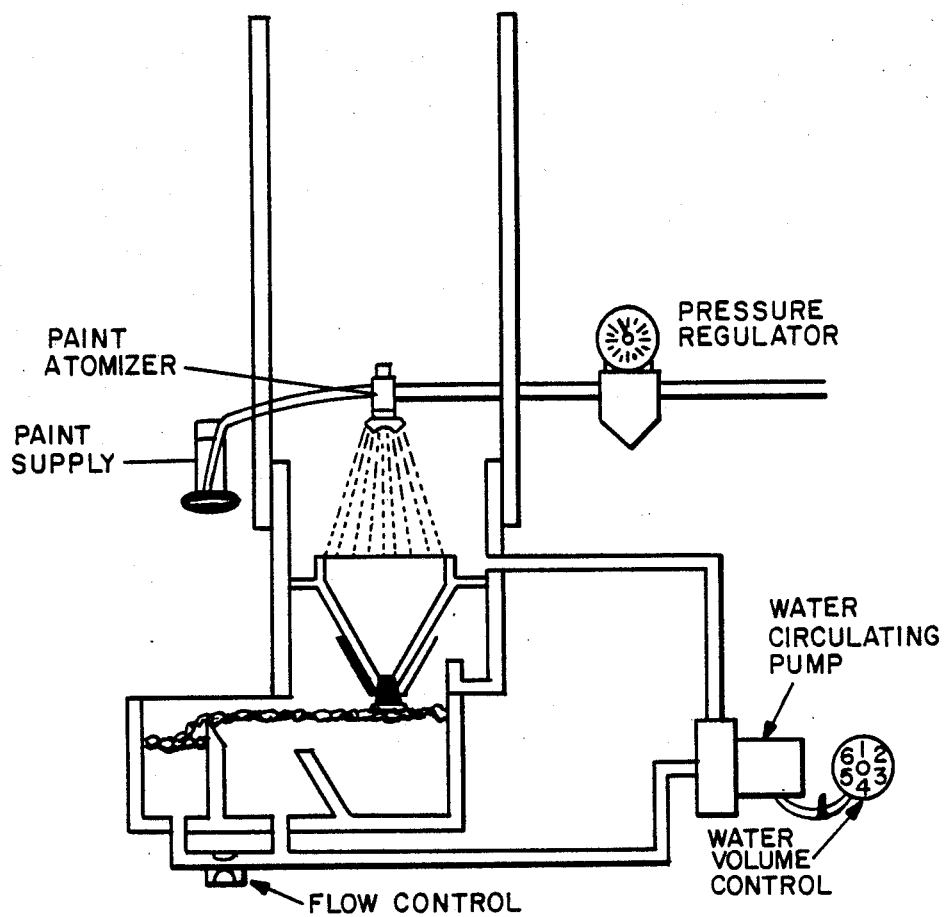

CATIONIC COAGULANTS PLUS COLLOIDAL SILICA FOR USE IN PAINT DETACKIFICATION

This application is a continuation-in-part of Ser. No. 226,595, filed Aug. 1, 1988 now U.S. Pat. No. 4,863,615.

This invention relates to a wet spray booth treating agent and to a method for the treatment of a wet spray booth by the use of the agent, and more particularly relates to a wet spray booth treating agent for diminishing the tackiness of coating material entrained in the circulating water to be sprayed for collecting surplus paint and precluding the coating material from adhering fast to the interior of the circulating water systems and to a method for the treatment of the circulating water by the use of the treating agent.

Generally in the coating process of the automotive industry, the yield of the paint applied to an automobile body ranges from 50 to 80% and the remainder 50 to 20% of the used paint constitutes an excess paint to be removed in the subsequent process. For the collection of the surplus paint sprayed excessively, the automobile body is treated in a wet spray booth adapted to give a wash with water and the water so used for the washing is circulated for re-use.

In the wet spray booth constructed as described above, since the surplus paint which is collected in the washing water has high tackiness, it adheres to the water-film panel, the piping system, the spray nozzle, etc. of the spray booth, clogs the piping system and the nozzle, and seriously degrades the efficiency of water washing. Further when the surplus paint so deposited clogs the waste gas discharge system and interferes with the flow air in the spray booth, the vapor of the solvent of the paint fills up the interior of the booth to produce a state dangerous to safety and hygiene and seriously degrade the shop environment. Moreover, the greater part of the surplus paint settles to the bottom of the booth and the bottom of the circulation pit in the spray booth system and the sediment of paint so formed hardens into a rubbery mass with elapse of time and the removal of this hardened mass and the cleaning of the bottoms take up much time and labor.

The paint collected in the washing water not merely undergoes adhesion or sedimentation within the system but also dissolves into components or disperses into fine particles. An increase in TDS accelerates the progress of corrosion inside the system. Further, the solvent in the paint not merely increases the hydrocarbon (HC) content of the waste gas from the both but also dissolves into the cleaning water and increases the COD of the water being circulated. The solvent of the paint, depending on the kind thereof, acidifies the circulating water and consequently accelerates the corrosion of the system.

Prior Art

U.S. Pat. No. 4,564,464—The compositions are pumpable, hectorite clay containing slurries. In addition to hectorite, which has been proven as a most effective detackifying agent, the slurries include thinning agents such as water-soluble aliphatic and/or alicyclic amines. Water conditioning agents, such as water-soluble polyphosphates are also made part of the slurry formulation.

U.S. Pat. No. 4,629,572—Paint spray booth wastes from clear oil-based coating compositions, such as lacquers, which have been collected in a water wash are easily detackified and removed from the wash water by contacting the wastes in the wash water with (1) a water-dispersible polymeric condensation reaction product of a urea or an amino triazine and an aldehyde and (2) a water-swellable clay.

U.S. Pat. No. 4,504,395—The compositions comprise a hectorite clay, an anti-foaming agent and optionally, an aluminum oxide material and a montmorillonite clay. These compositions are introduced into a paint spray booth water wash system so as to detackify oversprayed paint.

U.S. Pat. No. 4,153,548—An acidic silica sol and coagulating polymer are used to reduce the tackiness of paint solids of electrodeposition paints and to condition such solids so that they can be separated and removed from the drippings and wash water obtained as a result of the application of electrodeposition paints to various types of products. The polymers used in the practice of this invention are usually acrylamide polymers or anionic acrylamide polymers.

U.S. Pat. No. 3,515,575—An improvement in the process of deactivating and collecting paints with a water curtain in a water wash booth comprises maintaining in the water at least 0.5 ppm of a water-soluble polymer having an average molecular weight of from 1,000 to 15,000,000 and having repeated groups with the formula

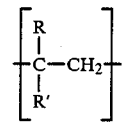

wherein R is a hydrogen or methyl group and R' is an amide or carboxyl group.

A number of polymers are suggested in col. 4 of the specification. Mentioned in passing is that the polymers may be used in conjunction with absorbents. A wide variety of absorbents are mentioned, one of which is colloidal silica. No other reference to colloidal silica is made.

U.S. Pat. No. 3,738,945 discloses preferred polymers used in the invention, e.g. epiclorohydrin dimethylamine ammonia polymers. The patent does not teach or suggest treating paint spray booth waters.

The Drawing

The drawing is of a laboratory scale paint spray recirculation tester.

The Invention

The invention comprises a method for the treatment of circulating water which collects surplus paint in a paint spray booth which comprises treating this water with a paint detackifying amount of a paint detackification agent composition comprising (A) a water soluble cationic polymeric coagulant having a molecular weight less than 500,000, and;

(B) An aqueous colloidal silica sol having an average particle size between about 1–150 nm, with the ratio of A to B being from 1/50 to 50/1 (actives basis).

The invention also provides as novel compositions described above as (A) and (B), set forth.

The Paints

The invention detackifies a wide degree of paint products including water-based paints, oil-based paints, lacquers, enamels, and the newer high-solid paints.

The invention is particularly adapted to detackifying high-solid paints and clear coats which are applied in the form of organic solvent suspensions. A particularly noteworthy advantage of the invention is that it is capable of coagulating pigmented base coat and clear overcoats when such contaminations are present together in the circulating waters of paint spray booths.

The Water-Soluble Low Molecular Weight Cationic Polymeric Coagulants

These cationic polymeric coagulants have molecular weights less than 500,000, preferably less than 100,000, and usually within the range of 10-200,000.

A preferred water-soluble cationic polymeric coagulant of the type described above is the subject of U.S. Pat. No. 3,738,945, the disclosure of which is incorporated herein by reference and is made a part hereof.

A preferred composition of this type is the reaction produce of epichlorohydrin dimethylamine and ammonia in accordance with the teachings of U.S. Pat. No. 3,738,945, which product has a molecular weight of about 50,000. This particular polymer is in the form of a 48% by weight aqueous solution and is referred to hereafter as Polymer 1.

Another useful polymer is a 20% by weight solution of polydiallyldimethyl ammonium chloride (DAD-MAC) having a molecular weight of about 100,000. This particular polymer is referred to hereafter as Polymer 2.

Other cationic polymeric coagulants include such low molecular weight polymers are melamine formaldehyde resins of the type described in U.S. Pat. No. 4,656,059. Similarly, water-soluble urea formaldehyde resins may be used. Also useful are the polyethylene imines or any of the water-soluble polymers described in Canadian Patent No. 731,212, the disclosure of which is incorporated herein by reference.

The Polymers are preferably employed as dilute aqueous solutions, e.g. 5-15% weight. Commercially, they are usually supplied as concentrates and can be diluted on-site. The amount of polymers used in the practice of the invention vary between 1 and 1,000 ppm by weight of the circulating water in the paint spray booth. Routine experimentation will determine the optimum dosage.

The Aqueous Colloidal Silica Sols

These products are well known and are produced by the neutralization with demetallization or deionization and subsequent concentration. Typical commercial silica sols are those set forth below in Table I. The products listed below are all commercially available from Nalco Chemical Company, One Nalco Center, Naperville, Ill. 60566-1024.

TABLE I

| Product | % Silica | Specific Gravity | Particle Size (nm) | pH |
|---|---|---|---|---|
| Nalcoag[1] 1115 | 15 | 1.100 | 4 | 10.4 |
| Nalcoag 1130 | 30 | 1.21 | 8 | 10.0 |
| Nalcoag 1030 | 30 | 1.20 | 13 | 10.2 |
| Nalcoag 1140 | 40 | 1.30 | 15 | 9.7 |
| Nalcoag 1050 | 50 | 1.39 | 20 | 9.0 |
| Nalcoag 1060 | 50 | 1.39 | 60 | 8.5 |
| Nalcoag 2329 | 40 | 1.0 | 80 | 8.4 |
| Nalcoag 2326 | 14.5 | 1.10 | 5 | 9.0 |
| Nalcoag 2327 | 40 | 1.29 | 20 | 9.3 |
| Nalcoag 1034A | 40 | 1.2 | 20 | 3.0 |

[1]Registered trademark of Nalco Chemical Company

The preferred particle size range used in this invention is between 1-20 nm, although larger particle sizes up to about 150 nm may be used. The amount of colloidal silica used in the compositions of the invention vary between 1 to 5,000 ppm.

Ratio of the water-Soluble Cationic Polymeric coagulants to Colloidal Silica.

The ratio of the water-soluble polymeric coagulants to colloidal silica may generally be within the range of 1/50 to 50/1, preferably it is 1/5 to 5/1 (actives basis).

EXAMPLE 1

In this test (see the drawing), desired amounts of detackifiers are added to the water manually or using a chemical pump to monitor the chemical demand. These detackifiers are allowed to mix in the tank through water recirculation for 5 minutes. The paint being tested is then sprayed into the chamber at a rate of 2 ml/min. through an air atomized spray gun located 12 inches above the center of the scrubbing section. The test paint is sprayed for 5 minutes, then the paint kill is tested for tackiness or stickiness. The testor wets his hand with the water solution in the test tank, then takes a sample of the floating paint sludge from the water tank, squeezes, and rubs tightly between his fingers. Any tackiness or stickiness present is a poor paint kill. A chart for degree of paint kill is provided here to assure consistent description. A minimum degree of kill of 6 is required to assure booth cleanliness.

At the conclusion of a good paint kill, paint is continuously sprayed, and the paint sludge conditions tested every few mintues. At any given time, if any trace of tackiness of sludge is present, paint spray should be discontinued and the program re-examined. The amount of paint sprayed should be recorded, the chemical dosage, and condition of sludge.

Additional chemicals should be added and paint spray resumed. Repeat this process at least four times.

| Chart for Degree of Paint Kill | |
|---|---|
| 10 Perfect | Complete kill, sludge is soupy |
| 9 Excellent | Paint sludge is non-tacky, non-gritty |
| 8 Very Good | Paint sludge is not tacky or gritty, but slightly plastic, may roll |
| 7 Good | Not tacky, plastic cosistency, sludge rolls and can easily reroll |
| 6 OK | Minimum performance, very slightly tacky. It rolls with water and reroll. Can wash off without rubbing. |
| 5 Borderline | May stick slightly to glove, but fails off with rubbing. |

-continued

| Chart for Degree of Paint Kill | |
|---|---|
| 4 Unacceptable | Slight tacky, sticks to glove with pressure, does not rub off, may roll. |
| 3 Moderate failure | Does not roll, stick to glove, smears |
| 2 Severe failure | Tacky, smears |
| 1 Very sticky | Smears |
| 0 Like raw paint | |

The detackification effects were tested against high solids enamels. The results are set forth below in Tables II and III.

TABLE II

| Program | Tap water No Treatment | Initial Charge | Final Total Added | PPG DCT 3000 Clear Coat Sprayed |
|---|---|---|---|---|
| Polymer No. 1/ Nalcoag 1115 | ½ (Actives basis) | 500 ppm | 900 ppm | 161 · mls |
| 8000/8001 | 4/1 (results from lab sample 8/87) | 425 ppm | 650 ppm | 124 · mls. |

The new system has been checked several times and gave reproducible results. Other paint samples were also checked.

TABLE III

| System | Ratio | Initial | Final Total Added | Total MLS |
|---|---|---|---|---|
| Polymer No. 1/ Nalcoag 1115 | 1:2 (actives basis) | 500 ppm | 700 ppm | Inmont Garnet Red enamel Sprayed 67.0 |
| Polymer No. 1/ Nalcoag 1115 | 1:2 | 500 ppm | 700 ppm | DCT 3000 PPG Clear coat 92.0 |
| Polymer No. 1/ Nalcoag 115 | 1:2 | 500 ppm | 700 ppm | PPG #99 Black Cherry enamel 98.0 |

EXAMPLE 2

All systems were charged initially with 500 ppm of chemical and maintained with 100 ppm increments to 900 ppm total of chemical added. This equals the type of charge necessary for 8000/8001 to detackify DCT 3000 PPG clear coat.

The following results were yielded when using synthetic Chicago tap water;

TABLE IV

| System | Total mls PPG DCT 3000 Clear Coat Sprayed | Quality of Initial Kill |
|---|---|---|
| Polymer No. 1/ Nalcoag 1115 1:15 (actives basis) | 52.0 mls Somewhat dispersed | Kill 7 Very foamy |
| Polymer No. 1/ Nalcoag 1115 1:30 ratio | 42.0 mls Somewhat dispersed | Kill 7 |
| Polymer No. 1/ Nalcoag 1115 1:3 ratio | 66.0 mls Floating | Kill 7–8 |
| Polymer No. 1/ Nalcoag 1115 2:1 ratio | 24.0 mls | Kill 7 |
| Polymer No. 1/ Nalcoag 1115 3:1 ratio | 18.0 mls | Kill 6 |
| Recheck of Polymer No. 1/ Nalcoag 1115 1:3 ratio | 89.0 Floating | Kill 8 |
| Polymer No. 1/ Nalcoag 1115 1:2 ratio | 180. Floating | Kill 8–9 |
| Polymer No. 1/ Nalcoag 1115 1:1.5 ratio | 81.0 Floating | Kill 8 |

Having thus described out invention, we claim:

1. A composition useful in detackifying paint contained in the circulating waters which collects surplus paint from a paint spray booth which comprises:
   (A) A water soluble cationic polymeric coagulant formed by the reaction of epichlorohydrin, dimethylamine, and ammonia, and having a molecular weight less than 100,000, and;
   (B) An aqueous colloidal silica sol having an average particle size between about 1–150 nm,
with the ratio of A to B being from 1/5 to 5/1 on an actives basis.

2. The composition of claim 1 wherein the cationic water-soluble polymer is a water-soluble polymer formed by the reaction of epichlorohydrin dimethylamine and ammonia and has a molecular weight of 50,000 and the colloidal silica sol has an average particle size between 1–20 nm.

* * * * *